(12) United States Patent
Kendig et al.

(10) Patent No.: US 7,033,561 B2
(45) Date of Patent: Apr. 25, 2006

(54) PROCESS FOR PREPARATION OF POLYCRYSTALLINE SILICON

(75) Inventors: James Edward Kendig, Midland, MI (US); David Russell Landis, Midland, MI (US); Todd Michael McQuiston, Midland, MI (US); Michael Matthew Zalar, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 189 days.

(21) Appl. No.: 10/472,683

(22) PCT Filed: May 23, 2002

(86) PCT No.: PCT/US02/16754

§ 371 (c)(1),
(2), (4) Date: Sep. 23, 2003

(87) PCT Pub. No.: WO02/100776

PCT Pub. Date: Dec. 19, 2002

(65) Prior Publication Data

US 2004/0131528 A1    Jul. 8, 2004

Related U.S. Application Data

(63) Continuation-in-part of application No. 09/877,674, filed on Jun. 8, 2001.

(51) Int. Cl.
    C01B 33/02    (2006.01)

(52) U.S. Cl. ........................... 423/349; 423/342
(58) Field of Classification Search ............ 423/342, 423/341, 343, 347, 349
    See application file for complete search history.

(56) References Cited

U.S. PATENT DOCUMENTS

| 3,011,877 A | 12/1961 | Schweickert et al. ....... 422/199 |
| 3,147,141 A | 9/1964 | Ishizuka et al. ............ 118/724 |
| 3,809,571 A | 5/1974 | Berlat et al. ................ 117/106 |
| 3,933,985 A | 1/1976 | Rodgers ..................... 423/350 |
| 4,150,168 A | 4/1979 | Yatsurugi et al. ............ 427/51 |
| 4,179,530 A | 12/1979 | Koppl et al. .................. 427/51 |
| 4,217,334 A | 8/1980 | Weigert et al. ............. 423/342 |
| 4,311,545 A | 1/1982 | Bugl et al. .................. 156/613 |
| 4,526,769 A | 7/1985 | Ingle et al. ................. 423/342 |
| 4,851,297 A | 7/1989 | Allen et al. ................. 428/570 |
| 5,118,486 A | 6/1992 | Burgie et al. ............... 423/349 |
| 5,422,088 A | 6/1995 | Burgie et al. ............... 423/342 |
| 5,906,799 A | 5/1999 | Burgie et al. ............... 422/241 |

FOREIGN PATENT DOCUMENTS

| EP | 0294047 | 12/1988 |
| FR | 2523113 | 3/1982 |
| JP | H01-188414 | 7/1989 |
| JP | 02-519080 | 9/1989 |
| JP | H09-263504 | 7/1997 |
| JP | 11-049508 | 2/1999 |
| JP | 11-049509 | 2/1999 |

OTHER PUBLICATIONS

JP 10-316413, Dec. 2, 1998 Japanese Abstract.

*Primary Examiner*—Edward M. Johnson
(74) *Attorney, Agent, or Firm*—Catherine U. Brown

(57) ABSTRACT

A process for preparing polycrystalline silicon comprising the steps of (A) reacting trichlorosilane with hydrogen thereby forming silicon and an effluent mixture comprising tetrachlorosilane and disilane described by formula $H_nCl_{6-n}Si_2$ where n is a value of 0 to 6 and (B) co-feeding the effluent mixture and hydrogen to a reactor at a temperature within a range of about 600° C. to 1200° C. thereby effecting hydrogenation of the tetrachlorosilane and conversion of the disilane to monosilanes.

16 Claims, 1 Drawing Sheet

PROCESS FOR PREPARATION OF POLYCRYSTALLINE SILICON

CROSS REFERENCE TO RELATED APPLICATIONS

This application is a U.S. national stage filing under 35 U.S.C. §371 of PCT Application No. PCT/ U.S. 02/16754 filed on 23 May 2002, currently pending, which is a continuation-in-part of U.S. patent application Ser. No. 09/877, 674, filed on 8 Jun. 2001. This application claims priority to U.S. patent application Ser. No. 09/877,674 under 35 U.S.C. §120 and 35 U.S.C. §365(c).

FIELD OF THE INVENTION

The present invention is a process for the preparation of polycrystalline silicon by reductive chemical vapor decomposition (CVD) of trichlorosilane. More particularly the present invention relates to a CVD process for preparing polycrystalline silicon, where disilanes present in the gaseous effluent from the CVD process are converted to monosilanes in a hydrogenation reactor for converting tetrachlorosilane to trichlorosilane.

BACKGROUND OF THE INVENTION

High-purity semiconductor-grade silicon is typically prepared by the so called "Siemens" process where trichlorosilane (TCS) gas is reduced in the presence of hydrogen and deposited onto a heated silicon element. In such a process only about one-third of the silicon fed as TCS is deposited as elemental silicon, with the remainder exiting the reactor as an effluent gas typically comprising greater than 85 mol % unreacted TCS, 5–15 mol % tetrachlorosilane (STC) formed by the dehydrogenation of TCS, up to about 1 mol % of disilane ($Si_2H_6$) and chlorodisilanes, and particulate silicon.

In a typical CVD process the effluent gas is then separated by distillation into a low boiling fraction comprising dichlorosilane (DCS) and TCS which is recycled to the CVD reactor and a high-boiling fraction comprising STC, disilane, chlorodisilanes, and particulate silicon. The high-boiling fraction is then further processed in an additional step to separate the bulk of the STC from the other components. This recovered STC can then be hydrogenated to form TCS which is then recycled to the CVD reactor. The remaining components of the high-boiling fraction comprising disilane, chlorodisilanes, and particulate silicon can be further processed to crack the disilanes (hereinafter the term disilane(s) refers to those compounds described by formula $H_nCl_{6-n}Si_2$, where n is a value of from 0 to 6) and to separate the particulate silicon therefrom. A typical process for cracking the disilanes is where the disilanes are reacted with hydrogen chloride in the presence of a catalyst, such as palladium on a solid support, to effect conversion to monosilanes, and the particulate silicon is separated therefrom by a process such as spray drying.

Rogers, U.S. Pat. No. 3,933,985, describes a process for converting tetrachlorosilane to trichlorosilane. The process involves passing hydrogen and silicon tetrachloride vapors through a reaction chamber held at a temperature of between 900° C. and 1200° C.

Weigert et al., U.S. Pat. No. 4,217,334, describe an improved process for converting tetrachlorosilane to trichlorosilane. The process involves reacting trichlorosilane with hydrogen at a temperature of 600° C. to 1200° C., with a tetrachlorosilane and hydrogen mixture having a molar composition between 1:1 and 1:50 in equilibrium with trichlorosilane and hydrogen chloride, and suddenly quenching the mixture to below 300° C.

Oda, Japanese Appl. (Kokai) No.11-49508, suggests that hexachlorodisiloxane may be passed over a fixed catalyst along with hydrogen chloride to form chlorosilanes which may be fed into a CVD process for making polycrystalline silicon.

Burgie et al., U.S. Pat. No. 5,118,486, describe the spray drying of a liquid by-product stream containing silanes to separate silicon particles therefrom.

The cited art clearly does not recognize that the effluent gas from a CVD process for preparing polycrystalline silicon can be separated into a fraction containing STC and disilanes and that this fraction can be fed to a reactor for hydrogenation of the STC. Furthermore, the combining in the same reactor of the hydrogenation reaction and cracking of the disilanes provides a benefit to the hydrogenation process of lower required energy input to the reactor and higher yield from the hydrogenation process. This is because while the hydrogenation process is an endothermic equilibrium reaction, the cracking process is exothermic providing heat to the reactor and in addition consumes HCl thereby driving the equilibrium of the hydrogenation process to higher yields of TCS. These reactions are summarized as follows:

$SiCl_4+H_2$ $HSiCl_3+HCl$ and

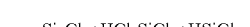

e.g. $Si_2Cl_6+HCl$ $SiCl_4+HSiCl_3$.

In addition to the above cited advantages, the present invention also reduces the concentrations of the pyrophoric and high-boiling disilanes in the process streams and consequently reduces complications and hazards in the operation and maintenance of process equipment.

SUMMARY OF THE INVENTION

A process for preparing polycrystalline silicon comprising the steps of
(A) reacting trichlorosilane with hydrogen thereby forming silicon and an effluent mixture comprising tetrachlorosilane and disilane described by formula $H_nCl_{6-n}Si_2$ where n is a value of 0 to 6 and
(B) effecting hydrogenation of the tetrachlorosilane and conversion of the disilane to monosilanes.

The present invention also relates to a process for preparing chlorosilanes comprising co-feeding a mixture comprising tetrachlorosilane, disilane described by formula $H_nCl_{6-n}Si_2$ where n is a value of 0 to 6, and hydrogen to a reactor at a temperature within a range of about 600° C. to 1200° C. to effect hydrogenation of the tetrachlorosilane and conversion of the disilane to monosilanes.

DESCRIPTION OF THE INVENTION

Figure 1:
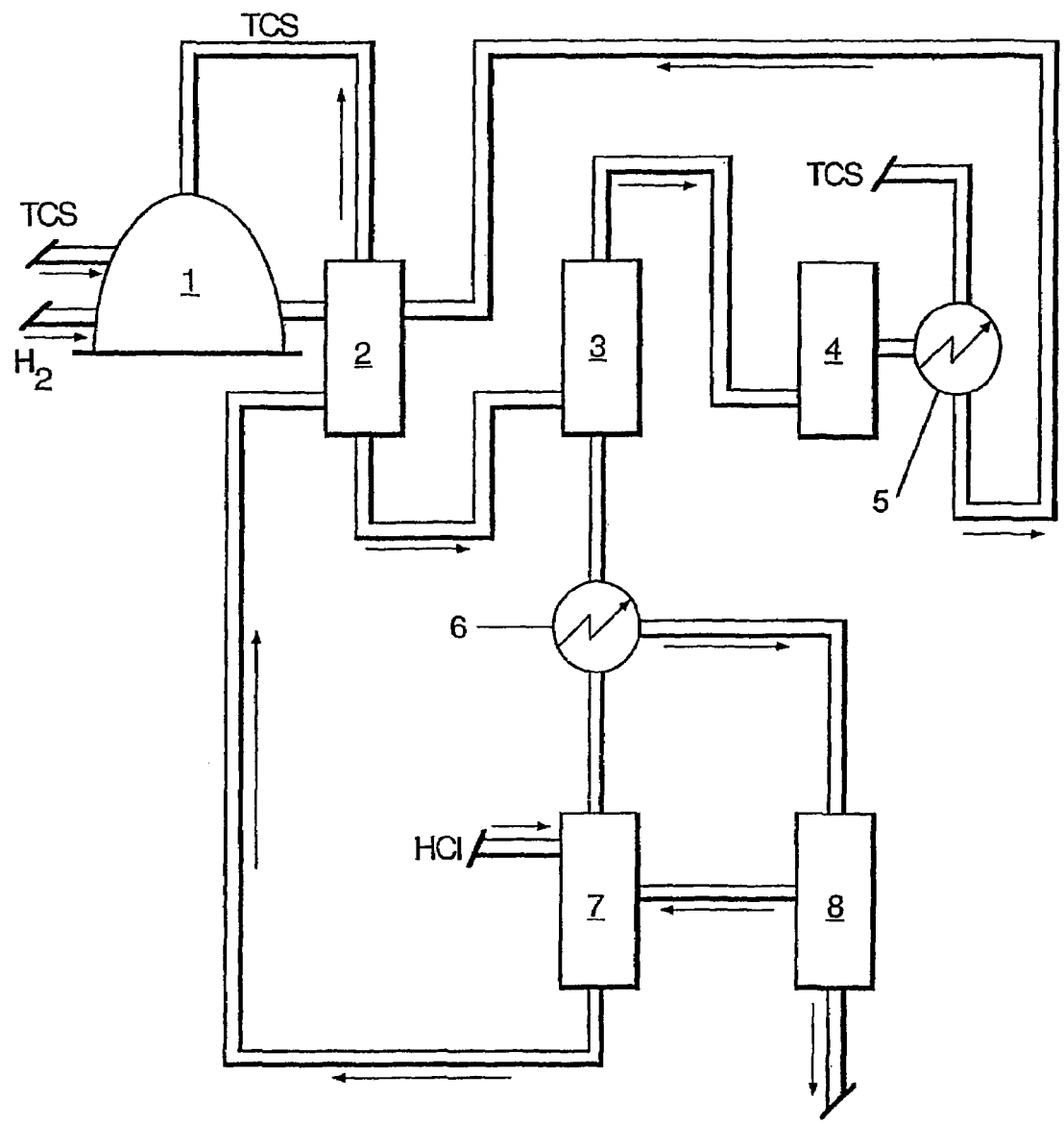
FIG. 1 illustrates elements of a commercial process for manufacturing polycrystalline silicon in a CVD reactor.

The present invention is a process for preparing polycrystalline silicon comprising the steps of (A) reacting trichlorosilane with hydrogen thereby forming silicon and an effluent mixture comprising tetrachlorosilane and disilane described by formula $H_nCl_{6-n}Si_2$ where n is a value of 0 to 6 and (B) effecting hydrogenation of the tetrachlorosilane and conversion of the disilane to monosilanes.

In step (A) of the present process, trichlorosilane is reacted with hydrogen to form silicon. The preferred process step (A) is conducted in a reactor for the deposition of the silicon onto a heated element, typically a silicon slim rod (or seed rod). However, the present process is not limited to such and is also applicable to processes where the silicon is formed, for example, as a powder. The preparation of polycrystalline silicon by reductive chemical vapor decomposition/deposition (CVD) is known in the art. Representative examples of the apparatus and method are described in, for example, Schweickert et al., U.S. Pat. No. 3,011,877; Schweickert et al., U.S. Pat. No. 3,099,534; Ishizuka, U.S. Pat. No. 3,147,141; Yatsurugi et al., U.S. Pat. No. 4,150,168; Koppl et al., U.S. Pat. No. 4,179,530; and Bugl et al., U.S. Pat. 4,311,545, all of which are incorporated herein by reference for such teachings.

It is also known in the art that in step (A) only about 5–40 mol % of the trichlorosilane fed to the reactor is reduced to silicon and the remainder exits the reactor as an effluent mixture comprising trichlorosilane, tetrachlorosilane and disilanes described by formula $H_nCl_6Si_2$ where n is a value of 0 to 6. In addition, this effluent mixture may contain unreacted hydrogen gas, higher boiling silicon containing oligomers, silanes described by formula $Cl_mSiH_{4-m}$ where m is a value of 0 to 3, particulate silicon, and organochlorosilanes. In a preferred present process the disilanes in the effluent mixture are hexachlorodisilane, pentachlorodisilane, and tetrachlorodisilane, preferably in about a 50:40:10 molar ratio.

In step (B) of the present process, the effluent mixture from step (A) can be co-fed with hydrogen to a reactor which is at a temperature within a range of about 600° C. to 1200° C. to effect hydrogenation of the tetrachlorosilane and conversion of the disilanes to monosilane. It is preferred that the effluent mixture be processed through one or more separation steps such as illustrated in FIG. 1 to isolate a mixture comprising primarily STC and disilanes prior to the conduct of step (B). More preferred is when the effluent mixture is process through one or more steps providing for a mixture comprising greater than about 90 mol % STC and 0.01 to about 10 mol % disilanes, preferably 0.01 to about 1 mol % disilanes, and the mixture is free of particulate silicon.

Step (B) can be conducted in any reactor suitable for effecting the hydrogenation of tetrachlorosilane to trichlorosilane. Such reactors are described, for example, by Weigert et al., U.S. Pat. No. 4,217,334, Burgie et al., U.S. Pat. No. 5,422,088, and Burgie et al. U.S. Pat. No. 5,906,799, which are hereby incorporated by reference for such teaching. Preferred is a reactor similar to that taught by Burgie et al., supra. The hydrogenation reactor is maintained at a temperature of 600° C. to 1200° C., preferably about 800° C. to 1200° C., and more preferably about 900° C. to 1100° C. The molar ratio of STC to $H_2$ can be within a range of about 1:1 to 1:50, with a molar ratio of 1:1.5 to 1:15 being more preferred. The hydrogenation of STC is an endothermic equilibrium reaction described by the following equation: $SiCl_4+H_2 \rightleftharpoons HSiCl_3+HCl$.

Alternatively, in step (B) of the present process, the effluent mixture from step (A) can be co-fed with hydrogen and HCl to a reactor which is at a temperature of about 400° C. to about 600° C. and at a pressure of about 100 psig to about 600 psig to effect hydrogenation of the tetrachlorosilane and conversion of the disilanes to monosilanehydrogen. Alternatively, the temperature can be about 450° C. to about 500° C. and pressure can be about 300 to about 600 psig. In this embodiment, the reactor can be a fluidized bed reactor. In this embodiment, step (B) can be conducted in various reactors, including those disclosed by Wagner et al., U.S. Pat. No. 2,595,620, Breneman, U.S. Pat. No. 4,676,967, Breneman, U.S. Pat. No. 4,743,344, Oda, U.S. Pat. No. 5,776,416, Griesshammer et al., DE 19534922, Aimoto et al., DE 19654154, and Oda, JP 11049508 A.

In step (B) the disilanes are cracked in the presence of the HCl formed by the hydrogenation reaction to, form monosilanes as exemplified by the following formula for hexachlorodisilane: $Si_2Cl_6+HCl \rightleftharpoons SiCl_4+HSiCl_3$, which is an exothermic reaction. The present inventors have discovered that not only is it possible to perform the hydrogenation of tetrachlorosilane and the cracking of disilanes in the same reactor, but also that this provides advantages over conducting the hydrogenation and cracking reaction in separate reactors. Such advantages include that since the cracking process is exothermic the heat of reaction is provided to the reactor to help maintain the temperature necessary for the endothermic hydrogenation reaction to occur. In addition since the cracking process consumes HCl produced in the hydrogenation equilibrium reaction, the equilibrium is driven toward an increased yield of TCS from the reaction. Another advantage is that since the disilanes are cracked as they are being produced and not accumulating in a sump of a separation column, the concentration of the pyrophoric disilanes in the process is significant reduced consequently reducing complications and hazards in the operation and maintenance of process equipment.

In a preferred process the TCS formed in step (B) is recovered and recycled to the reactor of step (A) while the STC is recycled to the hydrogenation reactor of step (B).

It should be noted that the use of step (B) need not be in association with the deposition of step (A). For example, the tetrachlorosilane and disilanes can be derived from other sources and simply put into the process of step (B). As such, the present invention also relates to a process for preparing chlorosilanes comprising co-feeding a mixture comprising tetrachlorosilane, disilane described by formula $H_nCl_{6-n}Si_2$ where n is a value of 0 to 6, and hydrogen to a reactor at a temperature within a range of about 600° C. to 1200° C. to effect hydrogenation of the tetrachlorosilane and conversion of the disilane to monosilanes.

The present process and its attendant advantages will now be further illustrated by reference to FIG. 1. FIG. 1 illustrates components of a commercial process for producing polycrystalline silicon in a CVD reactor. TCS and $H_2$ are fed to CVD reactor 1, where silicon is deposited on to a heated element. An effluent gas comprising as a principle component unreacted TCS and as minor components STC, disilanes, particulate silicon, etc. is removed from CVD reactor 1 and fed to distillation column 2. TCS is removed as an overhead from distillation column 2 and recycled to CVD reactor 1. A high-boiling mixture comprising STC, disilanes, particulate silicon, and other high boiling components is removed from the bottom of distillation column 2 and fed to vaporizer column 3. In the commercial process STC is taken off as the overhead from vaporizer column 3 and fed to hydrogenation reactor 4 where approximately 15 to 30 mol % of the STC is converted to TCS. The product from hydrogenation reactor 4 is then fed to condenser 5 where TCS is recovered and recycled to CVD reactor 1 and STC is recycled to distillation column 2. The high boiling component from vaporizer column 3, typically comprising a mixture of STC and about 25 to 50 mol % disilanes along with a minor component of particulate silicon is fed to vaporizer 6 and then to cracker 7 which contains a catalyst such as palladium on carbon to facilitate cracking of the disilanes. Hydrogen chloride is also fed to cracker 7 to effect cracking of the disilanes. A small stream from vaporizer 6 is fed to spray dryer 8, where the particulates are separated from the disilanes (primarily $Si_2Cl_6$ and $HSi_2Cl_5$) which are then fed to cracker 7 for cracking to monosilanes. The product from cracker 7 is then fed to distillation column 2 for further separation.

In the present process, vaporizer 3 is operated in a mode such that the overhead comprises STC and preferably essentially all of the disilane provided to the process from CVD reactor 1. This overhead is fed to hydrogenation reactor 4, where hydrogenation of STC and cracking of the disilanes is effected. No catalyst is required for the cracking process. This allows for the potential elimination of cracker 7 as well as the other benefits discussed above for the present process.

The following example is offered as illustrative of the present claimed process. This example is not intended to limit the scope of the claims herein.

EXAMPLE 1

A commercial CVD process for preparing polycrystalline silicon similar to that illustrated by FIG. 1 herein was adapted to run a process within the scope of the present invention. The effluent gas from CVD reactor 1 comprising approximately 75 to 85 mol % TCS, 8 to 12 mole % STC, 2 to 10 mol % DCS, 0.1 to 1 mol % disilanes (primarily $Cl_6Si_2$, and $Cl_5HSi_2$), and a minor amount of particulate silicon was fed to distillation column 2. In distillation column 2, TCS was taken off as an overhead and recycled to CVD reactor 1 and the higher boiling fraction comprising the STC, disilanes, and particulate silicon was fed to vaporizer column 3. Vaporizer column 3 was modified for this run by re-routing the reflux and feed flows into the column sump, and reducing the reflux ratio to a level ($\leq 0.2:1$) to allow disilanes to exit the column as a component of an overhead fraction. From vaporizer column 3, an overhead fraction comprising 90 mol % STC with the remainder being disilanes (approximately 90 mol % of the disilanes fed to vaporizer column 3) was fed to hydrogenation reactor 4. A sample port was positioned in the flow line between vaporizer column 3 and hydrogenation reactor 4 and samples periodically withdrawn for analysis by gas chromatography and visual observation. The samples were found to contain 0.16 to 0.26 mol % disilanes, to be clear, and to contain no particulate silicon. The temperature of hydrogenation reactor 4 was monitored and found to increase slightly over its normal condition indicating that the exothermic cracking of the disilanes was occurring. The bottom fraction of vaporizer column 3, containing 6 to 10 mol % of total disilanes from the CVD reactor, was processed by standard techniques; however the inventors believe that it is possible to operate the present inventive process in a manner such that the disilanes in the bottom fraction of vaporizer column 3 are negligible and catalyst containing cracker 7 can be eliminated.

EXAMPLE 2

A laboratory process is designed for once through hydrogen and silicon tetrachloride (STC) feed. STC feed is provided from a proportioning pump supplied by a 10 gallon feed tank. The hydrogen source for this process is a bank of two cylinders. STC and hydrogen are mixed just prior to entering a vaporizer contained in an inert convective oven that will superheat the mixed feed to the desired reaction temperature and house 1 inch diameter vibrational bed reactors (VBRs) piped in series. The vibrations are induced by a piston type vibrator located on the top of the oven. Each VBR is loaded with metallurgical grade silicon particles in the 50 to 200 micrometer range and provides about 30 to 50 seconds of residence time. This allows the capture of reaction data out to approximately 150 seconds. An automated gas chromatography (GC) sample system is provided to obtain compositional data at each reactor. The reactor effluent flows from the oven to a single pass coiled water cooler. This reduces the effluent material temperature to allow for product condensation. Once the product is in the separator, light hydrogen gas flows off the top of the separator through a back pressure controller and into the scrubber. The condensed chlorosilanes flow to a 10 gallon product tank by way of level control on the separator tank.

The operating parameters for the laboratory process are as follows:

| | |
|---|---|
| Silicon Particle Size: | 50–200 micrometers |
| Reaction Pressure: | 100 or 500 pounds per square inch gauge (psig) |
| Reaction Temperature: | 500–650° C. |
| $H_2$/STC Molar Ratio: | 1/1–5/1 |
| Superficial Velocity: | 1–3 centimeters per second (cm/sec) |

Without wishing to be bound by theory, it is thought that the following reactions occur. Overall Reaction:

$$Si + 3\ SiCl_4 + 2H_2 \rightarrow 4\ HSiCl_3,$$

assuming the following general reactions:

$$3\ SiCl_4 + 3H_2 \rightarrow 3\ HSiCl_3 + 3\ HCl \qquad 1)$$

$$3\ HCl + Si \rightarrow HSiCl_3 + H_2. \qquad 2)$$

Silicon particles that have passed through a 150 micron mesh screen but not a 75 micron mesh screen are placed into the VBRs and heated to 500° C. Nitrogen is fed through the system while heating. When the reaction temperature is reached, the hydrogen and silicon tetrachloride are introduced. Hydrogen is regulated to 500 psig and is fed at a rate of 620 standard cubic centimeters per minute (SCCM) while silicon tetrachloride is fed at a rate of 35 cubic centimeters per minute (cc/min) for a molar ratio of 3/1 and a superficial velocity through the VBRs of 2 cm/sec.

We claim:
1. A process for preparing polycrystalline silicon comprising the steps of
   (A) reacting trichlorosilane with hydrogen thereby forming silicon and an effluent mixture comprising tetrachlorosilane and disilane described by formula $H_nCl_{6-n}Si_2$ where n is a value of 0 to 6 and
   (B) co-feeding the effluent mixture, hydrogen, and HCl to a reactor at a temperature of abut 400° C. to about 600° C. and at a pressure of about 100 to about 600 psig thereby effecting hydrogenation of the tetrachlorosilane to trichlorosilane and conversion of the disilane to monosilanes.

2. A process according to claim 1 further comprising (C) recovering trichlorosilane formed in step (B) and recycling to step (A).

3. A process for preparing polycrystalline silicon comprising the steps of
(A) depositing silicon on a heated element by the reaction of trichlorosilane with hydrogen thereby forming an effluent mixture comprising trichlorosilane, tetrachlorosilane, disilane described by formula $H_nCl_{6-n}Si_2$ where n is a value of 0 to 6, and particulate silicon,
(B) separating the effluent mixture into a fraction comprising trichlorosilane and a high-boiling fraction comprising the tetrachlorosilane, disilane, and particulate silicon, where the trichlorosilane is recycled to step (A),
(C) removing the particulate silicon from the high-boiling fraction,
(D) co-feeding the high-boiling fraction from step (C), hydrogen, and HCl to a reactor at a temperature of about 400° C. to about 600° C. and a pressure of about 100 to about 600 psig thereby effecting hydrogenation of the tetrachlorosilane to trichlorosilane and conversion of the disilane to monosilanes, and
(E) recovering trichlorosilane formed in step (D) and recycling to step (A).

4. A process for preparing polycrystalline silicon comprising the steps of
(A) reacting trichlorosilane with hydrogen thereby forming silicon and an effluent mixture comprising tetrachlorosilane and disilane described by formula $H_nCl_{6-n}Si_2$ where n is a value of 0 to 6 and
(B) co-feeding the effluent mixture and hydrogen to a reactor at a temperature within a rage of about 600° C. to 1200° C. thereby effecting hydrogenation of the tetrachlorosilane to trichlorosilane and conversion of the disilane to monosilanes.

5. A process according to claim 4 further comprising (C) recovering trichlorosilane formed in step (B) and recycling to step (A).

6. A process according to claim 4, were the disilane is a mixture of hexachlorodisilane, pentachlorodisilane, and tetrachlorodisilane.

7. A process according to claim 4, where the effluent mixture of step (A) is processed through one or more separation steps to isolate a mixture comprising primarily tetrachlorosilane and disilane prior to the conduct of step (B).

8. A process according to claim 4, where the effluent mixture fed to step (B) comprises greater than about 90 mol % tetrachlorosilane and 0.01 to about 10 mol % disilane.

9. A process according to claim 4, where the effluent mixture fed to step (B) comprises greater than 90 mol % tetrachlorosilane and about 0.01 to about 1 mol % disilane.

10. A process according to claim 4, where the reactor temperature in step (B) is about 900° C. to 1100° C. and the molar ratio of tetrachlorosilane to $H_2$ is within a range of 1:1.5 to 1:15.

11. A process for preparing polycrystalline silicon comprising the steps of
(A) depositing silicon on a heated element by the reaction of trichlorosilane with hydrogen thereby forming an effluent mixture comprising trichlorosilane, tetrachlorosilane, disilane described by formula $H_nCl_{6-n}Si_2$ where n is a value of 0 to 6, and particulate silicon,
(B) separating the effluent mixture into a fraction comprising trichlorosilane and a high-boiling fraction comprising the tetrachlorosilane, disilane, and particulate silicon, where the trichlorosilane is recycled to step (A),
(C) removing the particulate silicon from the high-boiling fraction,
(D) co-feeding the high-boiling fraction from step (C) and hydrogen to a reactor at a temperature within a range of about 600° C. to 1200° C. thereby effecting hydrogenation of the tetrachlorosilane to trichlorosilane and conversion of the disilane to monosilanes, and
(E) recovering trichlorosilane formed in step (D) and recycling to step (A).

12. A process according to claim 11, were the disilane is a mixture of hexachlorodisilane, pentachlorodisilane, and tetrachlorodisilane.

13. A process according to claim 11, where the effluent mixture fed to step (B) comprises greater than about 90 mol % tetrachlorosilane and 0.01 to about 10 mol % disilane.

14. A process according to claim 11, where the effluent mixture fed to step (B) comprises greater than about 90 mol % tetrachlorosilane and 0.01 to about 1 mol % disilane.

15. A process according to claim 11, where the reactor temperature in step (B) is about 900° C. to 1100° C. and the molar ratio of tetrachlorosilane to $H_2$ is within a range of 1:1.5 to 1:15.

16. A process for preparing chlorosilanes comprising co-feeding a mixture comprising tetrachlorosilane, disilane described by formula $H_nCl_{6-n}Si_2$ where n is a value of 0 to 6, and hydrogen to a reactor at a temperature within a range of about 600° C. to 1200° C. to effect hydrogenation of the tetrachlorosilane and conversion of the disilane to monosilanes.

* * * * *